United States Patent
Arrigoni et al.

(10) Patent No.: US 10,246,580 B2
(45) Date of Patent: Apr. 2, 2019

(54) THERMOPLASTIC POLYMER MASTERBATCH

(71) Applicants: Dow Corning Corporation, Midland, MI (US); Multibase Inc., Copley, OH (US); Multibase SA, Saint Laurent Du Pont (FR)

(72) Inventors: Aurelie Arrigoni, Isere (FR); Stephane Cornelis, Manage (BE); Sandrine Faletto, Entre deux Guiers (FR); Yann Gradelet, Isere (FR); Jean De La Croix Habimana, Maurage (BE); Ted Hays, Akron, OH (US); Ludovic Perrin, Chapelle-lez-Herlaimont (BE); Patrick Prele, Savoie (FR)

(73) Assignees: Dow Silicones Corporation, Midland, MI (US); MULTIBASE INC, Copley, OH (US); MULTIBASE SA, St. Laurent Du Pont (FR)

( * ) Notice: Subject to any disclaimer, the term of this patent is extended or adjusted under 35 U.S.C. 154(b) by 20 days.

(21) Appl. No.: 15/123,278

(22) PCT Filed: Mar. 2, 2015

(86) PCT No.: PCT/EP2015/054279
§ 371 (c)(1),
(2) Date: Sep. 2, 2016

(87) PCT Pub. No.: WO2015/132190
PCT Pub. Date: Sep. 11, 2015

(65) Prior Publication Data
US 2017/0058114 A1 Mar. 2, 2017

(30) Foreign Application Priority Data
Mar. 4, 2014 (EP) .................... 14305308

(51) Int. Cl.
| | | |
|---|---|---|
| *C08L 23/04* | (2006.01) | |
| *C08L 23/12* | (2006.01) | |
| *C08L 23/16* | (2006.01) | |
| *C08L 51/00* | (2006.01) | |
| *C08L 83/04* | (2006.01) | |
| *C08J 3/00* | (2006.01) | |
| *C08J 3/22* | (2006.01) | |
| *C08L 87/00* | (2006.01) | |
| *C08K 3/34* | (2006.01) | |
| *C08K 5/00* | (2006.01) | |
| *C08G 77/20* | (2006.01) | |

(52) U.S. Cl.
CPC .............. *C08L 23/12* (2013.01); *C08J 3/005* (2013.01); *C08J 3/22* (2013.01); *C08K 3/34* (2013.01); *C08K 5/005* (2013.01); *C08L 23/04* (2013.01); *C08L 23/16* (2013.01); *C08L 83/04* (2013.01); *C08L 87/005* (2013.01); *C08G 77/20* (2013.01); *C08J 2323/12* (2013.01); *C08J 2387/00* (2013.01); *C08L 2310/00* (2013.01)

(58) Field of Classification Search
CPC ......... C08J 3/22; C08L 2310/00; C08G 77/20
See application file for complete search history.

(56) References Cited

U.S. PATENT DOCUMENTS

| | | | |
|---|---|---|---|
| 3,865,897 A | 2/1975 | Falender et al. | |
| 4,230,767 A * | 10/1980 | Isaka ................. | B32B 27/32 |
| | | | 428/349 |
| 5,637,634 A | 6/1997 | Gorgerin | |
| 5,708,085 A | 1/1998 | Hauenstein et al. | |
| 5,789,473 A | 8/1998 | Hauenstein et al. | |
| 5,844,031 A | 12/1998 | Chen et al. | |
| 6,048,942 A | 4/2000 | Buehler et al. | |
| 6,221,296 B1 * | 4/2001 | James ............. | G06K 19/06196 |
| | | | 264/153 |

(Continued)

FOREIGN PATENT DOCUMENTS

| | | |
|---|---|---|
| EP | 0710692 A2 | 5/1996 |
| EP | 1153975 A2 | 11/2001 |

(Continued)

OTHER PUBLICATIONS

PCT/EP2015/054279 International Search Report dated Jun. 10, 2015, 4 pages.

(Continued)

*Primary Examiner* — Jeffrey C Mullis
(74) *Attorney, Agent, or Firm* — Warner Norcross & Judd LLP

(57) ABSTRACT

A process for increasing the scratch resistance of a composition comprising a thermoplastic organic polymer and a scratch resistant polymer composition per se. The process for increasing the scratch resistance of a composition comprising a thermoplastic organic polymer (P) comprises reactively mixing a thermoplastic organic polymer (A) and an organopolysiloxane (B) in a first step (I) at a temperature at which the thermoplastic organic polymer (A) and the organopolysiloxane (B) are in liquid phases to form a masterbatch. The organopolysiloxane (B) contains at least one functionality capable of reacting with the thermoplastic organic polymer (A) so that a copolymer of components (A) and (B) is formed in the masterbatch during the reactive mixing. The process further comprises a second step (II) of mixing the masterbatch with the composition comprising the thermoplastic organic polymer (P).

20 Claims, No Drawings

(56) References Cited

U.S. PATENT DOCUMENTS

| | | | | |
|---|---|---|---|---|
| 6,569,931 | B2* | 5/2003 | Furukawa | C08L 23/10 524/266 |
| 6,602,953 | B1 | 8/2003 | Horio et al. | |
| 7,838,581 | B2 | 11/2010 | Kim et al. | |
| 8,436,098 | B2 | 5/2013 | Dittrich et al. | |
| 2004/0079129 | A1* | 4/2004 | Krajewski | B21D 26/055 72/60 |
| 2007/0112111 | A1 | 5/2007 | Jungkvist et al. | |
| 2013/0102703 | A1* | 4/2013 | Bar-Yaakov | C09K 21/14 523/456 |
| 2013/0267647 | A1* | 10/2013 | Tsujimoto | C08F 116/06 524/543 |
| 2015/0313807 | A1* | 11/2015 | Lynch | A61K 8/046 510/119 |

FOREIGN PATENT DOCUMENTS

| | | |
|---|---|---|
| JP | S5045033 A | 4/1975 |
| JP | H01306429 A | 12/1989 |
| JP | H08127660 A | 5/1996 |
| JP | H08239517 A | 9/1996 |
| JP | H08325423 A | 12/1996 |
| JP | 2002309041 A | 10/2002 |
| WO | WO02051934 A1 | 7/2002 |
| WO | 2009141185 A1 | 11/2009 |
| WO | 2010012475 A2 | 2/2010 |
| WO | WO2011083043 A1 | 7/2011 |
| WO | WO2011083044 A1 | 7/2011 |
| WO | 2013074637 A1 | 5/2013 |

OTHER PUBLICATIONS

English language abstract and machine translation for JPH01306429 (A) extracted from https://worldwide.espacenet.com database on Nov. 26, 2018, 6 pages.

English language abstract and machine translation for JPH08325423 (A) extracted from https://worldwide.espacenet.com database on Nov. 26, 2018, 16 pages.

English language abstract and machine translation for JP2002309041 (A) extracted from https://worldwide.espacenet.com database on Nov. 26, 2018, 11 pages.

* cited by examiner

THERMOPLASTIC POLYMER MASTERBATCH

CROSS-REFERENCE TO RELATED APPLICATIONS

This application is the National Stage of International Application No. PCT/EP2015/054279 filed on 2 Mar. 2015, which claims priority to and all advantages of European Patent Application No. 14305308.0 filed on 4 Mar. 2014.

FIELD OF THE INVENTION

This invention is concerned with a process for increasing the scratch resistance of a composition comprising a thermoplastic organic polymer. The invention also relates to a scratch resistant polymer composition comprising a blend of the said thermoplastic organic polymer composition with a masterbatch comprising an organopolysiloxane dispersed in a thermoplastic organic polymer.

BACKGROUND OF THE INVENTION

Plastic products are finding increasing application in automotive as well as consumer electronic markets. Since these products appear on the outside or exterior, their application demands good aesthetics not only in the initial stage of usage, but also during their continued usage. Plastics are known to get scratched quite easily or easily damaged from mar. To scratch means to break, mar, or mark a surface of by rubbing, scraping, or tearing with something sharp or rough. The surface of plastic parts can be visibly damaged in several ways, including (1) scratching by a sharp object; (2) abrasion by rubbing with an abrasive material or marring, which change the surface appearance or gloss; or (3) a "writing effect" of soft scratching with a dull object. A scratch is created when the material yields under an indentation, a sliding or lateral force, a ductile and/or brittle failure. In a scratch, an uneven surface results in non-uniform light scattering and "scratch whitening". Solutions for improving scratch performance include minimizing roughness of the polymer ground and lowering the shoulder of the scratch, resulting in less light scattering and lower scratch visibility.

Not all polymers are easy to scratch but some are more sensitive than others. Polypropylene (PP), one of the fastest growing polymers in automotive interior applications, is one that gets scratched easily. This is a drawback as it is known that the aesthetics of an automobile's interior largely depends on the surface aspects of the plastic interior trim parts.

Several technologies have been used to deliver automotive interior surfaces which are scratch resistant and warm to the touch. For luxury vehicles, the plastic parts are coated with thermoplastic olefin (TPO) skins, fabrics or paints. This concept is out of price for less expensive cars. For these large consumption cars, a number of solutions have been proposed to improve the quality of interior plastics parts. These include the use of anti-scratch additives such as alkyl amides, for example erucamide or oleamide, that are capable of migrating during the injection-moulding of the parts to cover the surface ('slip agents') providing scratch resistance properties and a soft-touch feel of the parts. However, there exists a considerable gap in surface quality and robustness of slip agents compared to paints and coatings and the automotive industry is still looking for new solutions.

Siloxane masterbatches containing high molecular weight siloxane polymer dispersed in various thermoplastic resins have been successfully used in automotive interior and exterior components and in consumer applications such as laptop computers and cellular phone cases, and in tubing and film markets. The siloxane polymer migrates to the surface in the melt phase and gives scratch and mar resistance without the adverse effect of additive exudation of a small molecule additive.

Siloxane masterbatches are masterbatches containing siloxane. A masterbatch is typically a solid additive for plastic or other polymer which is used to impart desired properties to this plastic or other polymer. A masterbatch is typically a concentrated mixture of additives encapsulated into a carrier resin during a process involving heat, which is then cooled and cut into granular shape. This enables to impart desired properties to a polymer. Masterbatches are typically in solid form at ambient temperature, usually in pelletized format. Siloxane masterbatches are typically pelletized micro-dispersions of siloxane polymers, in various different plastic carrier resins at loadings of up to 50%. Siloxane Masterbatches are produced in solid form for ease of use. They typically contain 25-50% siloxane polymers (typically >15 million cSt) dispersed with for example an average particle size of 5 microns in various thermoplastics. A siloxane is a compound which contains at least one Si—O—Si link. A polymer is a compound containing repeating units. A plastic or organic thermoplastic material or thermoplastic organic polymer is a polymer based on C—C links and having thermoplastic properties. A siloxane polymer also called polysiloxane or silicone is a polymer containing repeating Si—O—Si units. An organopolysiloxane compound is a polysiloxane bearing substituents which constituents contain organic moieties.

The most commonly used silicones are linear PDMS (polydimethylsiloxanes) of various viscosities, ranging from the shortest possible chain, hexamethyldisiloxane with a viscosity of for example 0.65 cSt, to polymers with high degrees of polymerization and viscosities over for example $10^6$ cSt, often called silicone gums. PDMS gums are usually fluids with viscosity around or higher than 600,000 cSt.

U.S. Pat. No. 5,844,031 describes a method of dispersing silicone compositions in organic thermoplastic materials. The compositions produced by the method of the invention have a fine and relatively uniform dispersion of organosilicone into the organic thermoplastic. An organosilicone resin ("resin" used herein to designate "MQ" silicone resin) and a predominantly linear silicone fluid are first blended to substantial homogeneity to form an organosilicone alloy. The organic thermoplastic and the organosilicone alloy are thereafter mixed at predetermined mixing temperature and shear.

U.S. Pat. No. 7,838,581 discloses a polypropylene resin composition for interior materials of a vehicle comprising 30 to 70 weight % of an ethylene/propylene block copolymer, 10 to 30% of an ethylene/[alpha]-olefin copolymer rubber, 1 to 10% of a styrene-based polymer rubber, 2 to 8% of a polypropylene-silicone rubber master batch, 1 to 7% of a magnesium compound and 10 to 40% of an inorganic filler.

U.S. Pat. No. 6,602,953 discloses a polyoxymethylene resin composition for moulding applications containing silicone-grafted polyethylene to give good release and slidability, solvent resistance and thermal stability.

WO-A-2011/083044 describes a process for grafting silicone onto a polyolefin comprising reacting the polyolefin with a polyorganosiloxane in the presence of means capable of generating free radical sites in the polyolefin, wherein the polyorganosiloxane contains at least one unsaturated group of the formula —X—CH=CH—R" in which X represents a divalent organic linkage having an electron withdrawing effect with respect to the —CH=CH— bond and/or containing an aromatic ring or a further olefinic double bond or acetylenic unsaturation, and R" represents hydrogen or a group having an electron withdrawing effect with respect to the —CH=CH— bond.

SUMMARY OF THE INVENTION

A process according to the present invention for increasing the scratch resistance of a composition comprising a thermoplastic organic polymer (P), comprises reactively mixing a thermoplastic organic polymer (A) and an organopolysiloxane (B) in a first step (I) at a temperature at which the thermoplastic organic polymer (A) and an organopolysiloxane (B) are in liquid phases to form a masterbatch, wherein the organopolysiloxane (B) contains at least one functionality capable of reacting with the thermoplastic organic polymer (A) so that a copolymer of (A) and (B) is formed in the masterbatch during the reactive mixing, and in a second step (II) mixing the masterbatch with the composition comprising thermoplastic organic polymer (P).

The present invention is able to produce a scratch resistant polymer composition containing a thermoplastic organic polymer (P) and a masterbatch obtained from reactively mixing a thermoplastic organic polymer (A) and an organopolysiloxane (B) at a temperature at which the thermoplastic organic polymer (A) and the organopolysiloxane (B) are in liquid phases, wherein the organopolysiloxane (B) contains at least one functionality capable of reacting with the thermoplastic organic polymer (A) so that a copolymer of (A) and (B) is formed in the masterbatch during the reactive mixing.

The thermoplastic organic polymer (P) is sometimes called the polymer matrix.

The masterbatch is incorporated into this matrix, usually in limited amounts.

The thermoplastic organic polymer (P) can be of the same nature than the thermoplastic organic polymer (A) used to form the masterbatch, or it can be different. To ensure compatibility, it may be preferred that the thermoplastic organic polymers (A) and (P) are of same or similar nature.

According to another aspect of the invention a scratch resistant polymer composition comprises a blend of 99 to 90 parts by weight of a thermoplastic organic polymer (P) with 1 to 10 parts by weight of a masterbatch produced by reactively mixing a thermoplastic organic polymer (A) and an organopolysiloxane (B) at a temperature at which the thermoplastic organic polymer (A) and an organopolysiloxane (B) are in liquid phases to form a masterbatch, wherein the organopolysiloxane (B) contains at least one functionality capable of reacting with the thermoplastic organic polymer (A) so that a copolymer of (A) and (B) is formed in the masterbatch during the reactive mixing.

DETAILED DESCRIPTION OF THE INVENTION

The thermoplastic organic polymer (A) can for example be a polyolefin, such as polypropylene. By polypropylene we mean polypropylene homopolymer or copolymer comprising propylene units. If present, the copolymer can for example be a polyethylene based on ethylene units. Preferably the polypropylene copolymer comprises at least 50% molar propylene units, more preferably at least 90% molar propylene units. The polypropylene can for example have a melt flow index of 10 to 2000 g/10 minutes as measured by ASTM D1238 at a temperature of 230° C. and an applied load of 2.16 kg.

The thermoplastic organic polymer (A) can alternatively be polyethylene or a copolymer of ethylene and propylene comprising less than 50% molar propylene units and more than 50% ethylene units. In another preferred embodiment, the thermoplastic organic polymer comprises less than 90% molar propylene units and more than 10% ethylene units.

We have found that use of a polyolefin of high melt flow index, for example a melt flow index of at least 100 g/10 minutes, in the masterbatch leads to a final polymer composition of enhanced scratch resistance compared to polyolefin of low melt flow index. Such a high melt flow polyolefin generally has a low molecular weight.

We have also found that use of a polyolefin of narrow molecular weight distribution in the masterbatch can provide a final polymer composition of enhanced scratch resistance.

The functionality of the organopolysiloxane (B) which is capable of reacting with the thermoplastic organic polymer (A) can be called a reactive functionality. This reactive functionality can be present in terminal groups. In other embodiments, the reactive functionality is present in pendant groups. In other embodiments, the reactive functionality is present in terminal and in pendant groups.

The reactive functionality can for example contain at least one of the following groups: alkenyl, Si—H, amino.

When the reactive functionality is an alkenyl functionality, the organopolysiloxane (B) can for example contain vinyl groups, or alternatively other alkenyl groups such as hexenyl or allyl groups. The alkenyl groups can be pendant and/or terminal groups in the organopolysiloxane (B).

The reactive functionality of the organopolysiloxane (B) can alternatively be Si—H functionality. The organopolysiloxane (B) can contain hydrogen atoms pendant to Si atoms in the siloxane chain and/or hydrogen atoms attached to terminal Si atoms.

The reactive functionality of the organopolysiloxane (B) can alternatively be an amino functionality. The amino functionality can for example be present in organic groups R which are aminoalkyl groups. The aminoalkyl group can for example be of the formula R'—(NH-A')$_q$-NH-A- wherein A and A' are each independently a linear or branched alkylene group having 1 to 6 carbon atoms and optionally containing an ether linkage; q=0-4; R' is hydrogen or an alkyl or hydroxyalkyl group having 1 to 4 carbon atoms. Most preferably R' is hydrogen; q=0 or 1; and A and A'(if present) each contain 2 to 4 carbon atoms. Examples of preferred aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)$_3$NH$_2$, —(CH$_2$)$_3$NH(CH$_2$)$_4$NH$_2$ and —(CH$_2$)$_3$O(CH$_2$)$_2$NH$_2$. The aminoalkyl groups can be pendant and/or terminal groups in the organopolysiloxane (B).

The organopolysiloxane (B) may comprise siloxane units selected from M units of the formula R$_3$SiO$_{1/2}$, and/or D units of the formula R$_2$SiO$_{2/2}$, and/or T units of the formula RSiO$_{3/2}$, and/or Q units of the formula SiO$_{4/2}$, where each R represents an organic group or hydrogen atom bonded to silicon. Organic groups R in the organopolysiloxane (B) other than the functional groups can for example be alkyl groups having 1 to 6 carbon atoms such as methyl or ethyl groups and/or aryl groups having 6 to 10 carbon atoms such as phenyl groups. If the unit bears more than one R, each R can be the same or different.

The organopolysiloxane (B) may comprise predominantly D and/or T units, although it will usually contain terminal M units. Predominantly means containing more than 50% molar units. The organopolysiloxane (B) can for example be a polydiorganosiloxane comprising at least 95% molar D units, optionally at least 99% D units. One example of a suitable polydiorganosiloxane is a vinyl-terminated polydimethylsiloxane.

The organopolysiloxane (B) in some embodiments has a high molecular weight such as a number average molecular weight Mn of above 100,000 g/mole. The organopolysiloxane (B) can for example have Mn above 200,000 g/mole, for example 200,000 to 2,000,000 g/mole. We have found that use of an organopolysiloxane (B) of high molecular weight, particularly an organopolysiloxane of Mn above 200,000 g/mole, in the masterbatch can lead to a final polymer composition of enhanced scratch resistance compared to organopolysiloxane of lower molecular weight.

When forming the masterbatch, the thermoplastic organic polymer (A) and the organopolysiloxane (B) are reactively mixed at a ratio usually in the range 10 to 90 parts by weight of the thermoplastic organic polymer (A) to 90 to 10 parts by weight of the organopolysiloxane (B), for example 30 to 70 parts by weight of the thermoplastic organic polymer (A) to 70 to 30 parts by weight of the organopolysiloxane (B). The thermoplastic organic polymer (A) and the organopolysiloxane (B) may be reactively mixed in the substantial absence of other components, that is less than 2% by weight of other components. A stabilising component may however be present, for example up to 1% by weight of an antioxidant such as that sold under the trade mark 'Irganox 1010'. The stabilising component can alternatively or additionally comprise up to 1% of silanol-treated silica, which may be incorporated as a concentrate in a thermoplastic organic polymer such as polypropylene.

The thermoplastic organic polymer (A) and an organopolysiloxane (B) are reactively mixed to form the masterbatch at a temperature at which the thermoplastic organic polymer (A) and the organopolysiloxane (B) are in liquid phases. The thermoplastic organic polymer (A) and the organopolysiloxane (B) can for example be mixed in melt blending equipment at a temperature in the range 180° C. to 250° C.

One example of suitable melt blending equipment is a twin screw extruder. A twin screw extruder having a length/diameter (L/D) ratio over 40 may be particularly suitable. The thermoplastic organic polymer (A) can for example be introduced into the main feed of a co-rotative twin screw extruder operating at a temperature high enough to melt the thermoplastic organic polymer. The organopolysiloxane (B) can be added into the already melted thermoplastic organic polymer phase using for example a gear pump. The residence time of the liquid phase reagents in the extruder can for example be 30 to 240 seconds, optionally 50 to 150 seconds.

Alternative melt blending equipment may be any of the traditional means for mixing additives into thermoplastic resin ("resin" usually designates a polymer matrix) at elevated temperature. For example, the two components may be blended in a twin-screw extruder, a Banbury mixer, a two-roll mill or a single-screw extruder, either with or without a mixing head.

The reactive mixing produces a reaction product of the thermoplastic organic polymer (A) and organopolysiloxane (B) which has a higher molecular weight than the starting organopolysiloxane (B). The number average molecular weight of the reaction product of (A) and (B) formed in the masterbatch is usually at least 1.1 times the number average molecular weight of the organopolysiloxane (B), and often at least 1.3 times the number average molecular weight of the organopolysiloxane (B).

Reactive mixing in melt blending equipment at a temperature in the range 180° C. to 250° C. generally produces sufficient reaction between the organopolysiloxane (B) and the thermoplastic organic polymer (A) without requiring any catalyst to promote the reaction. The reactive mixing can however be carried out in the presence of a catalyst, for example a compound capable of generating free radical sites in the polyolefin such as an organic peroxide or azo compound.

The masterbatch thus produced can be mixed with the thermoplastic organic polymer (P) to form a scratch resistant polymer composition having a lower concentration of organopolysiloxane than that in the masterbatch. The masterbatch may conveniently be cooled and divided into pellets before being mixed with the thermoplastic organic polymer (P). For example if the reactive mixing to form the masterbatch is carried out in an extruder, the masterbatch can be cooled by extrusion into a water bath and then divided into pellets.

The thermoplastic organic polymer (P) can for example be a polyolefin, such as polypropylene or a propylene copolymer such as a propylene ethylene copolymer. The thermoplastic organic polymer (P) can for example be of similar chemical type as the thermoplastic organic polymer (A). The thermoplastic organic polymer (P) can be identical to the thermoplastic organic polymer (A), or may be chemically the same as the thermoplastic organic polymer (A); for example the thermoplastic organic polymer (A) and the thermoplastic organic polymer (P) may both be polypropylene but optionally of different molecular weight and different melt flow index. Alternatively the thermoplastic organic polymer (A) and the thermoplastic organic polymer (P) can be of similar chemical type but not the same; for example the thermoplastic organic polymer (A) may be polypropylene with the thermoplastic organic polymer (P) being a propylene ethylene copolymer.

The masterbatch is generally incorporated in a minor amount in the thermoplastic organic polymer (P). For example the masterbatch is mixed with the thermoplastic organic polymer (P) at a ratio of 1 to 10 parts by weight of the masterbatch to 99 to 90 parts by weight of the thermoplastic organic polymer (P), preferably 1 to 5 parts by weight of the masterbatch to 99 to 95 parts by weight of the thermoplastic organic polymer (P).

The scratch resistant polymer composition may contain additives. These additives may comprise fillers, for example talc, calcium carbonate, kaolin or wollastonite. The additives may comprise pigments, for example carbon black or titanium dioxide. The additives may comprise additives such as antioxidants and/or UV stabilisers. Such additives can be mixed with the thermoplastic organic polymer (P) either before or after it is mixed with the masterbatch, or can be incorporated in the masterbatch.

An example of a suitable filler is a mineral fibre filler, such as the synthetic mineral-based fibre sold by Milliken, Inc. as a nucleating agent under the trade mark 'Hyperform HPN-68L'. We have found that incorporation of 1 to 3% by weight of the silicone masterbatch of this invention with 0.1-2% by weight 'Hyperform HPN-68L' in a polypropylene composition forms highly scratch resistant moulded products with excellent surface properties. It seems the silicone masterbatch and synthetic mineral-based fibre filler act synergistically in improving scratch resistance. Incorporation of 1.5% by weight silicone masterbatch with 0.2% by weight 'Hyperform HPR-803i' in a polypropylene composition gives equal or better scratch resistance than incorporation of 0.2% by weight 'Hyperform HPN-68L' without silicone masterbatch, or than incorporating 1.5% of the silicone masterbatch without Hyperform-68L. The silicone masterbatch is also very effective when used with other nucleating agents.

We have found that polymer compositions formed in accordance with the present invention may achieve a high scratch resistance finish at a low level of additive without being detrimental to the thermo-mechanical properties of the plastic matrix.

The masterbatch according to the present invention wherein the thermoplastic organic polymer (A) and the organopolysiloxane (B) are reactively mixed achieves a higher scratch resistance when incorporated into a further thermoplastic organic polymer (P) than can be achieved by incorporation at the same level of a blend of thermoplastic organic polymer and organopolysiloxane which have not been reactively mixed.

It has also been observed that the scratch resistant polymer compositions according to the invention may show increased resistance to stress whitening.

The scratch resistant polymer compositions of the invention are generally suitable for all applications requiring scratch resistant thermoplastic polymer compositions, particularly thermoplastic polyolefin compositions such as polypropylene compositions. Such applications include automobile interior applications such as dashboards, fascias, handles and other interior trim. Applications also include casings for consumer electrical and electronic equipment such as laptops and cellular phones.

EXAMPLES

The invention is illustrated by the following Examples, in which parts and percentages are by weight. The Examples are described with reference to the accompanying drawings, of which Figure 1 is a graph depicting scratch resistance results obtained in Examples 13 to 18.

Examples 1 to 12

Pellets of polypropylene homopolymer of melt flow Index of 12 (230° c./2.16 kg) as the polymer matrix of the silicon masterbatch, are introduced into a co-rotative twin screw extruder. In some Examples the polypropylene contained as stabilizer a concentrate of 25% of cab-O-Sil™ silica treated with short silanol capped siloxane in MFI 12 polypropylene homopolymer. In other Examples the polypropylene contained as stabilizer Irganox 1010 antioxidant, and yet other Examples contained no stabiliser as shown in Table 1. Then silicone gum (vinyl-terminated polydimethylsiloxane of Mn 343,600 and Mw 649,900) is added into the already melted polypropylene phase using a gear pump. For all the compositions, the ratio of polyorganosiloxane to polypropylene matrix is 50:50.

All the components are mixed into a twin screw extruder having a L/D ratio of 48) and diameter of the screw 45 mm. The average screw temperature was 215° C. with a specific screw profile designed to disperse finely all the components into the polypropylene. The Examples used various screw speeds and engine amperage (energy output varies with engine amperage) as shown in Table 1. Depending of the screw speed and the engine amperage, the residence time of the melt vary between 50 to 150 seconds. The mixtures are cooled with a water bath to room temperature and pelletized.

To get the molecular weights information for the silicone component of the masterbatch product, the pellets are extracted with xylene at reflux. Substantially all the product dissolved. The solution was cooled to ambient temperature (25° C.). Polypropylene and polypropylene-rich reaction product was precipitated whilst polysiloxane and polysiloxane-rich reaction product remained in solution. This product remaining in xylene solution was analysed by gel permeation chromatography to get the molecular weights information for the silicone component of the masterbatch (number average molecular weight Mn, weight average molecular weight Mw and molecular weight distribution MWD=Mw/Mn). All data are compiled in Table 1.

TABLE 1

| Example | Screw Speed rpm | Energy Output A | Silica % | Irganox 1010 % | Mn g/mole | MW g/mole | MWD | Feed rate Kg/h |
|---|---|---|---|---|---|---|---|---|
| 1 | 250 | 85 | 1.5 | 0 | 388600 | 747100 | 1.92 | 80 |
| 2 | 250 | 45 | 1.5 | 0 | 461900 | 893300 | 1.95 | 40 |
| 3 | 550 | 85 | 1.5 | 0 | 498500 | 1173000 | 2.35 | 100 |
| 4 | 350 | 55 | 1.5 | 0 | 437900 | 1003000 | 2.29 | 60 |
| 5 | 550 | 45 | 1.5 | 0 | 550700 | 1518000 | 2.76 | 50 |
| 6 | 250 | 85 | 0 | 0 | 364600 | 706500 | 1.95 | 100 |
| 7 | 550 | 85 | 0 | 0 | 285300 | 1097000 | 4.25 | 100 |
| 8 | 350 | 55 | 0 | 0 | 484100 | 1002000 | 2.07 | 60 |
| 9 | 550 | 45 | 0 | 0 | 476400 | 1436000 | 3.01 | 50 |
| 10 | 250 | 85 | 0 | 0.5 | 375300 | 666300 | 1.78 | 80 |
| 11 | 250 | 45 | 0 | 0 | 372200 | 879800 | 2.36 | 40 |
| 12 | 550 | 45 | 0 | 0.5 | 379200 | 728500 | 1.92 | 50 |
| Silicone reagent | — | — | — | — | 343600 | 649900 | 1.89 | — |

It can be seen from Examples 1 to 12 that reactive mixing in the melt in a twin screw extruder under the conditions described leads to an increase in molecular weight of the organopolysiloxane component, showing that the vinyl-terminated polydimethylsiloxane and the polypropylene had reacted to produce some copolymer of the vinyl-terminated polydimethylsiloxane and the polypropylene.

Examples 13 to 18

Silicone masterbatches were produced from the silicone and polypropylene used in Examples 1-12 using the process conditions described in Examples 10 and 1-5. The Mn of the silicone component of each masterbatch was measured and is shown in Table 3 below. Table 3 shows that each of the different processing conditions allowed the molecular weight to increase substantially.

A typical polypropylene compound for interior automotive application containing 67.3% polypropylene/ethylene copolymer of MFI 30-35 (230° c./2.16 kg), 20% of talc (D50s=1µ), 7% of low density polyethylene of flexural modulus=10 MPa, 0.3% of phosphite antioxidant, 0.4% of HALS (hindered amine) acting as anti UV system, 2% of carbon black masterbatch (40% in polypropylene), is produced on a corrotative twin screw extruder having L/D-48, D=45 mm, a screw speed varying from 0-550 rpm and a maximum temperature of 350° C. 3% of the silicone masterbatch of each of Examples 13 to 18 was incorporated. During the compounding process, the extruder is set to operate with at 224 nM of Torque, 30 A of the motor power; 20-25 bars pressure head, 20-30 bars Die pressure. The silicone masterbatch is added at 3% into the screw when the polypropylene pellets are fully melted and all other additives fully mixed, the blend is allowed to mix for 60-100 s. The melt is die cut, cooled with a water bath to room temperature and pelletized.

In a comparative experiment C1, a conventional silicone masterbatch was prepared from the silicone and polypropylene used in Examples 1-12 under less intensive mixing conditions and was added at 3% into the screw during production of the typical polypropylene compound for interior automotive application described above.

Pellets of the polypropylene compounds produced in Examples 13 to 18 are moulded into bars samples to determine mechanical properties and plaques to determine scratch resistance. Samples bars are produced with DEMAG Ergotech 80-310 injection moulding machine using mold AXICOM B. Plaques with grained surface (PSA grain P100, and Renault grain 21336) are made with BILLON140 HERCULE injection moulding machine using mold PA. The main injection moulding parameters to prepare sample bars and aesthetical plaques are described in table 2.

TABLE 2

| Injection moulding parameters | | DEMAG ERGOTECH 80-310 | Billion 140 HERCULE |
|---|---|---|---|
| SAMPLES | units | Samples bars | PAS plaques |
| T° met | ° c. | 200 | 220 |
| Injection speed | cm3/s | 7 | 30 |
| Post pressure | Bars | 9 | 50 |
| T° mold | ° c. | 40 | 40 |

The flexural modulus of the sample bars produced above is determined following ISO 178 norm at room temperature (25° C.), while the Notched Charpy impact is determined following ISO 179 norm at room temperature. The results are shown in Table 3.

The plaques produced above are scratch tested using the Volkswagen PV 3952 norm test in which an engraving tool is drawn over the test surface at a defined application pressure and the color change ΔL resulting from the scratch test is measured by a spectrophotometer. A lower ΔL result indicates improved scratch resistance, with a result below 1.5 being considered satisfactory. The results are shown in Table 3.

TABLE 3

| Example | Silicone Mn g/mole | Flexural Modulus mPa | Notched Charpy impact kJ/m² | Scratch Resistance ΔL |
|---|---|---|---|---|
| | no silicone masterbatch | 2162 | 10 | 4.26 |
| C1 | 329400 | 2161 | 12 | 0.65 |
| 13 | 411800 | 2177 | 10.9 | 0.45 |
| 14 | 391400 | 2116 | 11.8 | 0.53 |
| 15 | 417800 | 2225 | 11.2 | 0.47 |
| 16 | 393000 | 2190 | 11.3 | 0.52 |
| 17 | 373200 | 2212 | 13.2 | 0.51 |
| 18 | 452200 | 2219 | 10.8 | 0.33 |

The results listed in Table 3 are shown graphically in Figure 1. Although there is some experimental variation, it can be seen the ΔL decreases (the scratch resistance increases) when the average number molecular weight increases and that the mechanical properties of the compound (Flexural Modulus and Notched Charpy Impact) are not greatly affected by the addition of the scratch resistance additive. The scratch resistance of the compound produced with the polypropylene automobile interior composition but without the addition of silicone additive is the worst (4.26) of the series.

All the polypropylene automobile interior compositions containing silicone masterbatch had ΔL values well below 1.5, showing that the silicone masterbatch is a good anti-scratch additive. The polypropylene automobile interior compositions containing silicone masterbatch produced according to the present invention had improved scratch resistance (lower ΔL) than the C1 composition containing conventional silicone masterbatch. The scratch resistance improved with increasing molecular weight of the organopolysiloxane component, showing that increased reaction of the organopolysiloxane and the polypropylene to produce copolymer during mixing leads to improved scratch resistance.

Examples 19 to 24

Pellets of different polypropylene homopolymers of Melt flow Index 12, 15, 40, 400, 800 and 1200 (230° C./2.16 kg) were introduced into a PRISM 24 TSE HC twin screw extruder having a L/D ratio of 24 as the polymer matrix of a silicon masterbatch. The polypropylene homopolymers of Melt flow Index 40 and above were 'Borflow'™ polymers. The silicone gum described in Example 1 was added into the already melted polypropylene phase using a gear pump. For all the compositions, the ratio of silicone gum to polypropylene matrix is 50:50. The average screw temperature is between 200-230° C. with a specific screw profile designed to disperse finely all the components into the polypropylene. The mixing torque was maintained constant from one polypropylene grade to another to allow similar silicone gum dispersion. The extruded masterbatch compositions produced are cooled with a water bath to room temperature and pelletized.

3% of each of the silicone masterbatches produced in Examples 21 to 26 are incorporated into the polypropylene compound for interior automotive application described in Examples 13 to 19 on a co-rotative twin screw extruder having L/D-48, D=45 mm, a screw speed varying from 0-550 rpm and a maximum temperature of 350° C. During the compounding process, the extruder is set to operate with 224 nM of Torque, 30 A of the motor power; 20-25 bars pressure head, 20-30 bars Die pressure. The silicone masterbatch is added into the screw when the polypropylene pellets are fully melted and all other additives fully mixed. The blend is allowed to mix for a further 60-100 s. After extrusion the melt is die cut, cooled with a water bath to room temperature and pelletized.

Plaques patterned using Renault 21363 Grain or PSA P100 Grain are produced as described in Examples 13 to 19 and then scratch tested using Volkswagen PV 3952 norm test. Table 4 below shows the ΔL obtained as a function of the melt flow Index of the polypropylene used as a career for making the masterbatches.

TABLE 4

| Example | Polypropylene Source | MFI 230° C./ 2.16 kg | ΔL Renault 21363 Grain | ΔL PSA P100 Grain |
|---|---|---|---|---|
| 19 | | 12 | 3.05 | 3.58 |
| 20 | | 15 | 3.14 | 3.40 |
| 21 | | 40 | 3.30 | 3.95 |
| 22 | Borflow FB504 | 400 | 0.735 | 0.61 |
| 23 | Borflow FB508 | 800 | 0.587 | 0.46 |
| 24 | Borflow FB512 | 1200 | 0.678 | 0.375 |

It can be seen from Table 4 that silicone masterbatches produced using polypropylenes of melt flow index above 100 were particularly effective at imparting increased scratch resistance. In general, the higher the MFI, the lower is the molecular weight. We believe that high MFI polypropylene can form a polypropylene organopolysiloxane copolymer containing short siloxane blocks, which is probably more compatible with the polypropylene matrix.

The invention claimed is:

1. A process for increasing the scratch resistance of a composition comprising a thermoplastic organic polymer (P), the process comprising the steps of:
   (I) reactively mixing a thermoplastic organic polymer (A) and an organopolysiloxane (B) at a temperature at which the thermoplastic organic polymer (A) and the organopolysiloxane (B) are in liquid phases to form a masterbatch,
       wherein the organopolysiloxane (B) contains at least one functionality capable of reacting with the thermoplastic organic polymer (A) so that a copolymer of components (A) and (B) is formed in the masterbatch during the reactive mixing; and
   (II) mixing the masterbatch with the composition comprising thermoplastic organic polymer (P);
       wherein the thermoplastic organic polymer (P) is selected from the group consisting of polypropylene homopolymer, polypropylene copolymer comprising propylene units, polyethylene homopolymer, a copolymer comprising polyethylene units, and mixtures thereof; and
       wherein the organopolysiloxane (B) is the only organopolysiloxane added in the process.

2. The process according to claim 1, wherein the organopolysiloxane (B) comprises predominantly D units and/or T units.

3. The process according to claim 1, wherein the organopolysiloxane (B) contains alkenyl functionality.

4. The process according to claim 3, wherein the organopolysiloxane (B) is a vinyl-terminated polydimethylsiloxane.

5. The process according to claim 1, wherein the organopolysiloxane (B) has a number average molecular weight of 200,000 to 2,000,000 g/mole.

6. The process according to claim 1, wherein the thermoplastic organic polymer (A) is a polyolefin.

7. The process according to claim 6, wherein the polyolefin has a melt flow index in the range of 100 to 2,000 as measured by ASTM D1238 at a temperature of 230° C. and an applied load of 2.16 kg.

8. The process according to claim 1, wherein the thermoplastic organic polymer (P) and the thermoplastic organic polymer (A) are chemically the same.

9. The process according to claim 1, wherein the thermoplastic organic polymer (A) and the organopolysiloxane (B) are reactively mixed at a ratio of 10 to 90 parts by weight of the thermoplastic organic polymer (A) to 90 to 10 parts by weight of the organopolysiloxane (B).

10. The process according to claim 1, wherein the thermoplastic organic polymer (A) and the organopolysiloxane (B) are reactively mixed in the substantial absence of other components.

11. The process according to claim 1, wherein the thermoplastic organic polymer (A) and the organopolysiloxane (B) are reactively mixed in melt blending equipment at a temperature in the range of 180° C. to 250° C.

12. The process according to claim 11, wherein the thermoplastic organic polymer (A) and the organopolysiloxane (B) are reactively mixed in a twin-screw extruder.

13. The process according to claim 1, wherein the number average molecular weight of the reaction product of components (A) and (B) formed in the masterbatch is at least 1.1 times the number average molecular weight of the organopolysiloxane (B).

14. The process according to claim 1, wherein the masterbatch produced in step (I) is cooled and divided into pellets before being mixed with the thermoplastic organic polymer (P) in step (II).

15. The process according to claim 1, wherein the masterbatch produced in step (I) is mixed with the thermoplastic organic polymer (P) at a ratio of 1 to 10 parts by weight of the masterbatch to 99 to 90 parts by weight of the thermoplastic organic polymer (P).

16. A scratch resistant polymer composition comprising a blend of:
   99 to 90 parts by weight of a thermoplastic organic polymer (P); and
   1 to 10 parts by weight of a masterbatch;
   wherein the masterbatch is produced by reactively mixing a thermoplastic organic polymer (A) and an organopolysiloxane (B) at a temperature at which the thermoplastic organic polymer (A) and the organopolysiloxane (B) are in liquid phases to form the masterbatch;
   wherein the organopolysiloxane (B) contains at least one functionality capable of reacting with the thermoplastic organic polymer (A) so that a copolymer of components (A) and (B) is formed in the masterbatch during the reactive mixing;
   wherein the thermoplastic organic polymer (P) is selected from the group consisting of polypropylene homopolymer, polypropylene copolymer comprising propylene units, polyethylene homopolymer, a copolymer comprising polyethylene units, and mixtures thereof; and
   wherein the organopolysiloxane (B) is the only source of organopolysiloxane units in the scratch resistant polymer composition.

17. The scratch resistant polymer composition according to claim 16, wherein the thermoplastic organic polymer (A) and the thermoplastic organic polymer (P) are both polypropylene.

18. An automobile interior product comprising the scratch resistant polymer composition according to claim 17.

19. The process according to claim 6, wherein the thermoplastic organic polymer (A) is polypropylene.

20. The process according to claim 15, wherein the masterbatch produced in step (I) is mixed with the thermoplastic organic polymer (P) at a ratio of 1 to 5 parts by weight of the masterbatch to 99 to 95 parts by weight of the thermoplastic organic polymer (P).

* * * * *

UNITED STATES PATENT AND TRADEMARK OFFICE
CERTIFICATE OF CORRECTION

| | | |
|---|---|---|
| PATENT NO. | : 10,246,580 B2 | Page 1 of 1 |
| APPLICATION NO. | : 15/123278 | |
| DATED | : April 2, 2019 | |
| INVENTOR(S) | : Aurelie Arrigoni et al. | |

It is certified that error appears in the above-identified patent and that said Letters Patent is hereby corrected as shown below:

In the Specification

Column 7, Lines 37-40, the following sentence should be deleted:
"The Examples are described with reference to the accompanying drawings, of which Figure 1 is a graph depicting scratch resistance results obtained in Examples 13 to 18."

Column 9, Lines 57-58, the following sentence should be deleted:
"The results listed in Table 3 are shown graphically in Figure 1."

In the Claims

Column 11, Claim 1, Line 32, the following should be inserted before ".":
-- and wherein the composition is produced using 1 to 10 parts of the masterbatch per 90 to 99 parts thermoplastic organic polymer and wherein the composition has a scratch resistance of below 1.5 when measured according to the Volkswagen PV 3952 norm test under conditions in which polypropylene with an MFI of 12 (230 degrees centigrade/2.16 kg) and without the masterbatch has a scratch resistance of 4.26 --

Column 12, Claim 16, Line 46, the following should be inserted before ".":
-- and wherein the composition has a scratch resistance of below 1.5 when measured according to the Volkswagen PV 3952 norm test under conditions in which polypropylene with an MFI of 12 (230 degrees centigrade/2.16 kg) and without the masterbatch has a scratch resistance of 4.26 --

Signed and Sealed this
Twenty-seventh Day of August, 2019

Andrei Iancu
*Director of the United States Patent and Trademark Office*